July 5, 1955
H. F. GERWIG
2,712,422
SERVO MOTOR ASSEMBLY FOR NOSE WHEEL
STEERING GEAR AND THE LIKE
Filed Sept. 6, 1952
4 Sheets-Sheet 1
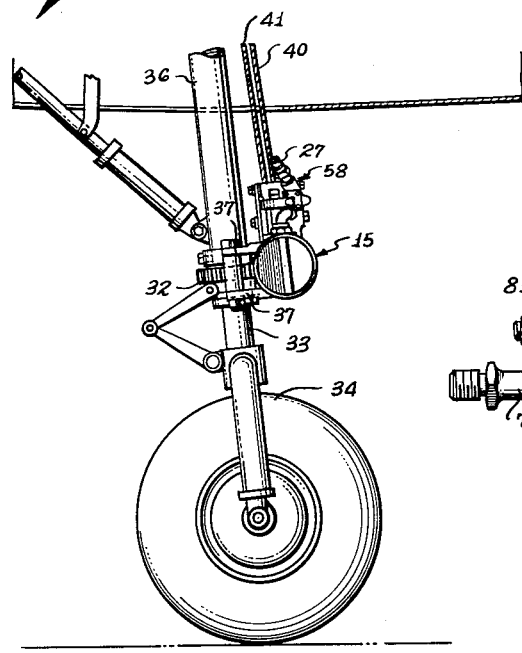
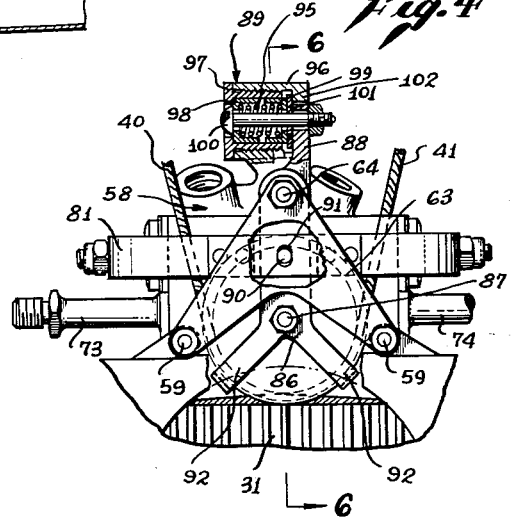
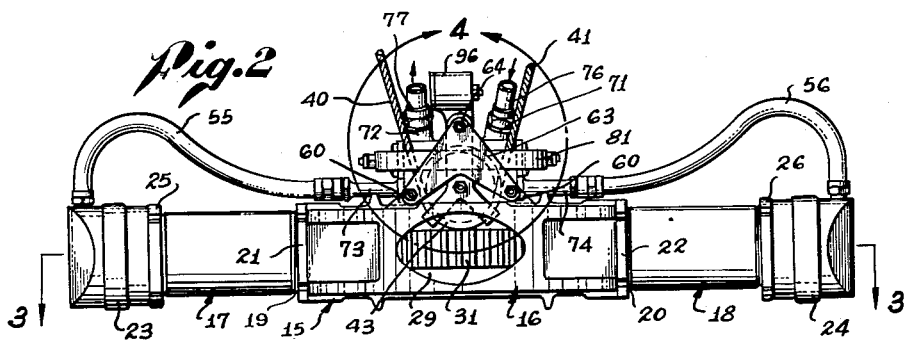
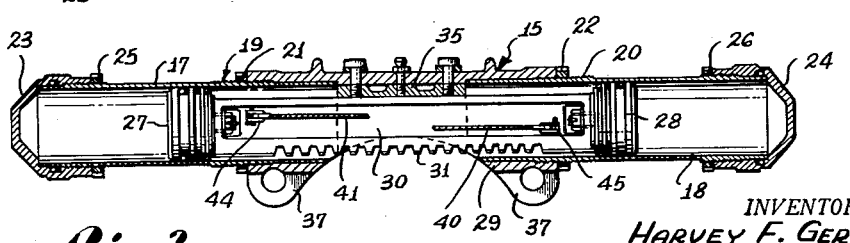
INVENTOR.
HARVEY F. GERWIG
BY Fulwider & Mattingly
Attorneys

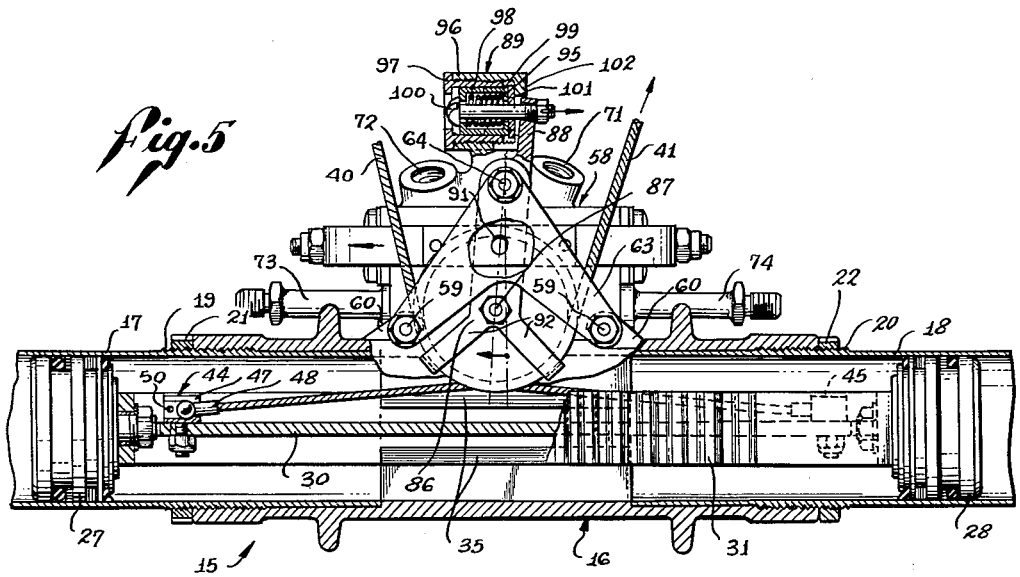

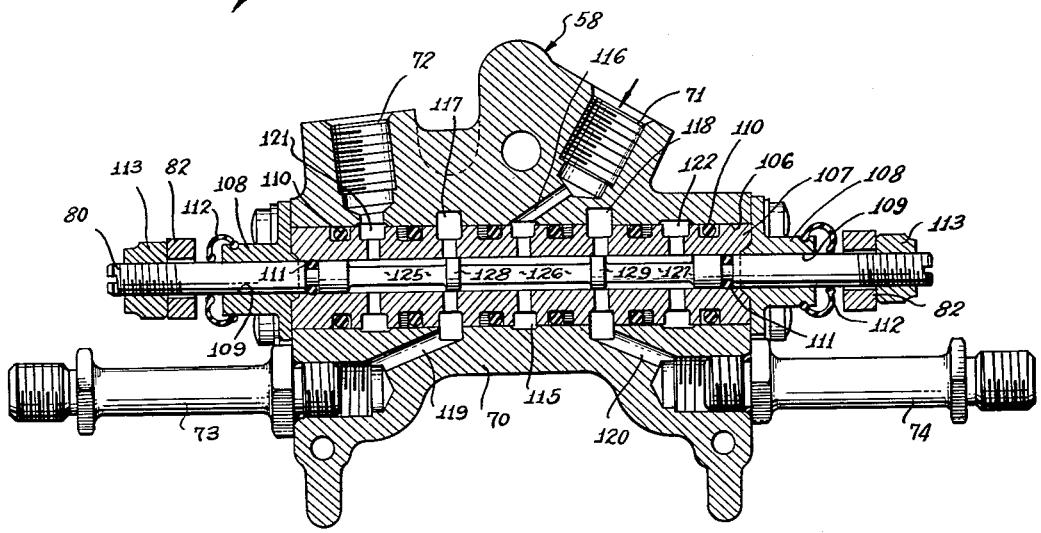
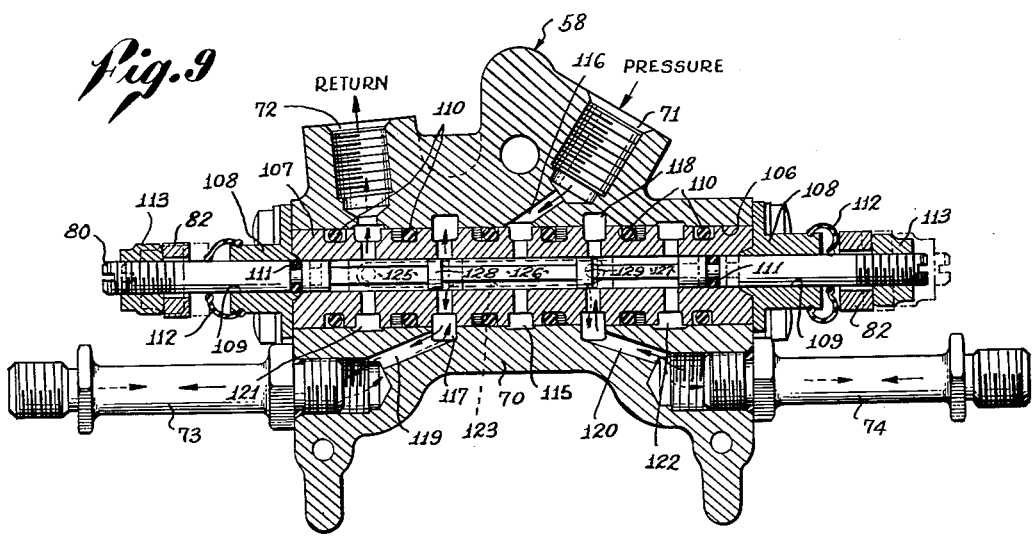

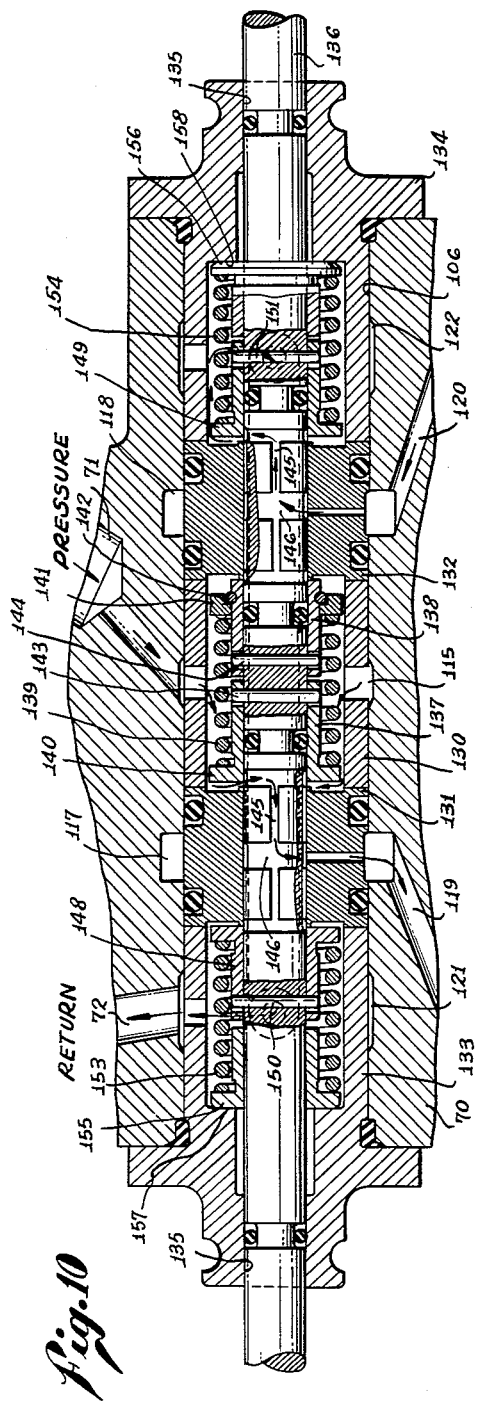
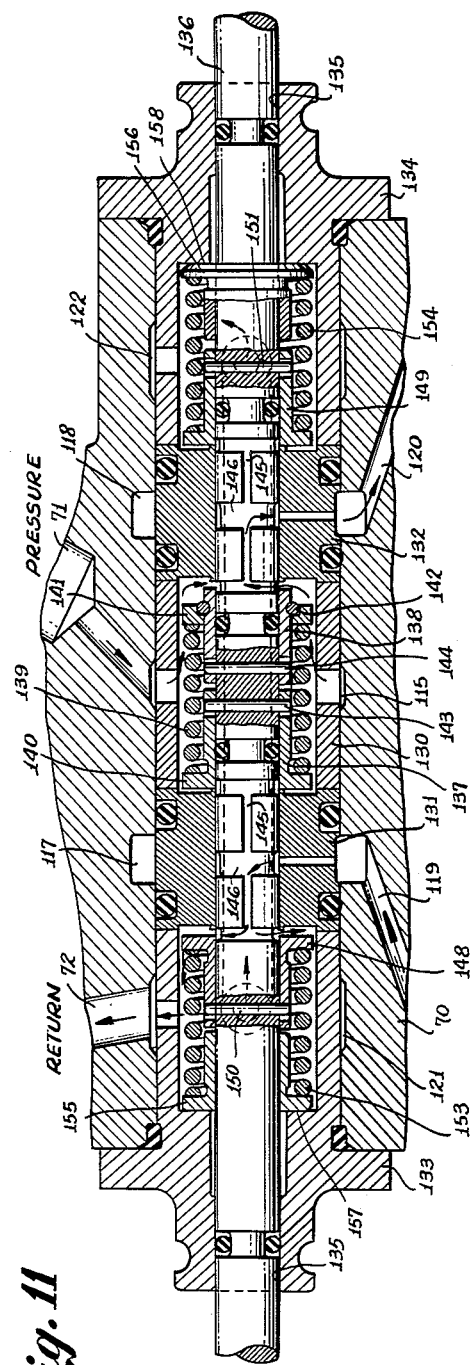

United States Patent Office 2,712,422
Patented July 5, 1955

2,712,422

SERVOMOTOR ASSEMBLY FOR NOSE WHEEL STEERING GEAR AND THE LIKE

Harvey F. Gerwig, Glendale, Calif., assignor to Weston Hydraulics, Limited, North Hollywood, Calif., a corporation of California Application September 6, 1952, Serial No. 308,273

11 Claims. (Cl. 244—50)

The present invention relates generally to servomotor assemblies for remote controls, and more particularly, to such a unit adapted especially for use in steering the nose wheel of tricycle aircraft landing gear.

The ground maneuvering and taxiing of large aircraft having tricycle landing gear is generally accomplished by providing a dirigible nose wheel and steering the craft by turning such dirigible wheel. On occasion, however, it is desired to turn the aircraft more sharply than can be accomplished by means of a single nose wheel, on which occasions it has become the practice to apply brakes selectviely to one or the other of the lateral landing wheels whereby to swing the craft sharply in the direction of the wheel which is braked. During such operation, it is desirable that the dirigible nose wheel be free to caster or rotate about its steering axis into such position that it follows the sharp turning movement rather than sliding sideways along the ground.

One conventional system for nose wheel steering is that in which the control effort of the pilot is transmitted to the nose wheel through a pair of tension cables. In the steering of large aircraft, however, particularly under adverse wind conditions and over somewhat uneven terrain, it is desirable that the pilot's efforts be supplemented by servomotor means such as a hydraulically or pneumaticauly operated motor responsive to the primary effort exerted through the steering control cables. While such mechanisms have been available in the past, they have not been wholly satisfactory for the reason that heretofore no simple response means has been available, and furthermore, no adequate safety means for rendering the system freely operable by manual effort in the event of a power failure has been provided.

Bearing in mind the foregoing discussion, it is a major object of the present invention to provide supplementary power means for operating the dirigible wheel of aircraft landing gear, which meets the above requirements and avoids the above-stated difficulties.

It is another object of the invention to provide power steering apparatus of the class described which is particularly adaptable for use with cable controls and is directly responsive to operative tension in the cables of such controls.

It is still another object of the present invention to provide apparatus of the class described which is readily modified to be either hydraulically or pneumatically controlled to suit the control power system of the particular ship in which it is installed.

It is a further object of the invention to provide a unit of the class described which leaves the dirigible wheel free to caster or turn when no manual effort is applied to the controls thereof.

Yet another object of the invention is to provide apparatus of the class described which is adapted to follow the manual operation of the dirigible wheel without material interference with such manual operation in the event of a failure of the hydraulic or pneumatic power.

The foregoing and additional objects and advantages of the invention will be apparent from the following detailed description thereof, consideration being given likewise to the attached drawings, in which:

Figure 1 is a fragmentary side elevational view of a dirigible nose wheel assembly equipped with power means embodying the present invention;

Figure 2 is an elevational view looking forward, showing the power steering attachment illustrated in Figure 1;

Figure 3 is a horizontal section taken on the line 3—3 in Figure 2;

Figure 4 is an enlarged fragmentary partially sectioned view of a portion of the apparatus shown in Figure 2 in the area identified by the reference character 4, the apparatus being shown in a condition in which no manual steering effort is being applied thereto;

Figure 5 is an enlarged partially sectioned elevational view similar to Figure 4, but showing the unit in the condition wherein manual steering effort is applied thereto;

Figure 6 is an elevational section taken on the line 6—6 in Figure 4;

Figure 7 is a horizontal section taken on the broken line 7—7 in Figure 6;

Figure 8 is an enlarged elevational section taken on the line 8—8 in Figure 6, showing a hydraulic valve assembly in the non-steering condition of Figure 4;

Figure 9 is a view similar to Figure 8, but showing the operational movements of the valve therein; and Figures 10 and 11 are further enlarged sectional views taken in a plane of Figure 8 but illustrating two operational positions of a modified form of valve used in connection with pneumatically powered steering units embodying the present invention.

The steering power unit embodying the present invention is designated generally by the reference character 15 in the drawings. The power unit 15 is adapted to be actuated by either pneumatic or hydraulic power by the relatively simple replacement of the interior parts of the valve assembly, as will be described in detail. Thus, the external appearance of the unit is unchanged by its modification from hydraulic to pneumatic power, or vice versa.

The general organization of the power unit itself is best seen in Figures 2 through 7. Here it will be seen that the unit 15 includes a central support body 16 which carries a pair of laterally extending power cylinders 17 and 18 threaded into the body as indicated at 19 and 20, respectively, and secured in place by threaded lock rings 21 and 22. The outer ends of the power cylinders 17 and 18 are closed by pressure heads 23 and 24 threaded onto the outer ends of the cylinders 17 and 18, respectively, and locked thereon by threaded locking rings 25 and 26. The entire structure is mounted to the steering wheel column 36 on the forward side thereof by bolts passing through spaced pairs of rearwardly extending lugs 37 on the body 16.

A pair of pistons 27 and 28 are slidably mounted in the respective cylinders 17 and 18, and are interconnected by a thrust strut 30 having an I-beam cross-section. The strut 30 is formed with rack teeth 31 in a surface of one flange thereof, and the rear side of the body 16 is cut away as indicated at 29 in Figure 3, whereby the rack teeth 31 may mesh with a gear 32 secured to a conventional pivot shaft 33 which carries a dirigible nose wheel 34. The remaining elements of the structure carrying the nose wheel 34 being conventional, no further description thereof is deemed necessary herein. Suffice it to say that rotation of the gear 32 in one direction or another serves to steer the wheel 34. Such rotation of the gear 32 is effected by longitudinal movement of the strut 30 within the power assembly 15, being guided in such longitudinal movement by passing through a T-shaped way 35 formed in the interior of the body 16 as seen best in Figure 6.

Thus it will be seen that steering movement of the wheel 34 is accomplished by moving the strut 30 back and forth within the steering assembly 15, the strut moving in the direction in which it is desired to turn the wheel 34. Manual steering effort is applied to the strut 30 by means of a pair of cables 40 and 41 which extend downwardly from the manual controls (not shown) to the power assembly 15, pass under a pair of sheaves 42 and 43, and thence along the top of the strut 30 to terminal attachment members 44 and 45 affixed to the web of the strut 30 at opposite ends thereof. The character of the terminal attachment members is best shown in Figure 5, wherein it will be seen that each member includes a specially shaped bolt 47, having a transversely bored and slotted head forming a seat to receive a conventional ball end 48 of the respective cable secured thereto. The ball end is retained in the bore of the bolt 47 by a transverse cotter key 50. Thus it will be seen that tension on one or the other of the two cables 40 and 41 draws the strut 30 in one direction or another for sliding movement in the way 35, thus rotating the gear 32 and hence the nose wheel 34 in one direction or another as desired.

Power assistance in the movement of the nose wheel is provided by admitting hydraulic fluid, or air under pressure into one or the other of the cylinders 17 and 18, thus to act on one or the other of the pistons 27 and 28 to urge the strut 30 in one direction or another within the assembly 15. Pressurized actuating fluid is delivered to the respective cylinders 17 and 18 from a valve assembly 58, hereinafter described, through connecting hoses 55 and 56, which also serve to return fluid from the cylinder toward which the strut 30 is moving at any particular time.

The compressed air or hydraulic fluid employed to actuate the respective pistons 27 and 28 is controlled by the valve assembly 58 which is mounted to the top of the power assembly 15, substantially midway between the ends thereof, being attached to the body 16 by transverse bolts 59 which pass through lugs 60 on the upper surface of the main body 16. Additional bracing of the valve assembly 58 is provided by dependant tabs 61 secured by bolts 62 to the forward side of the main body 16, and by an inverted V-shaped plate 63, the lower ends of which are secured by the bolts 59 and the upper end of which carries the rearward end of a pivot bolt 64, the purpose of which will later appear.

The valve assembly 58 includes a body 70 having pressure and return fluid connections 71 and 72, respectively, formed therein and cylinder connections 73 and 74 formed therein to receive the respective hoses 55 and 56. Hydraulic fluid or, alternatively, compressed air is delivered to the unit 15 from a conventional source (not shown) through a hose 76, and returned to the source through a hose 77.

The function of the valve assembly 58 is to communicate the pressure connection 71 selectively with one or the other of the cylinder connections 73 or 74, and at the same time communicate the return connection 72 with the appropriate cylinder connection 73 or 74. Such control of the fluid passing through the valve assembly 58 is accomplished by longitudinal movement of a valve spool 80 therein, the ends of which project from the respective ends of the valve body and are attached to a mechanically actuated control yoke 81 which lies rearwardly of the valve body 58.

As can be seen best in Figures 8 and 9, wherein the valve spool 80 is shown in its centralized position in Figure 8, the effect of longitudinal movement of the spool 80, as for example to the position shown in full line in Figure 9, is to communicate the pressure connection 71 with the cylinder connection 73, thus delivering pressurized fluid to the left-hand cylinder 17 whereby to move the strut 30 to the right. This, as will be hereinafter explained, is the direction in which the strut 30 would be moved by tension in the right-hand upwardly extending cable 41. At the same time, the cylinder connection 74 is connected to the return connection 72, whereby to release the fluid in the cylinder 18 for delivery back to the pressure source. The path of fluid through the valve is illustrated by full line arrows in Figure 9 for the full line position of the valve spool 80, and by dotted arrows for the opposite dotted line position of the valve spindle 80. An examination of such fluid paths will indicate that when the spindle 80 is moved to the right to the dotted line position shown in Figure 9, pressurized fluid is delivered into the cylinder 18 through the connection 74, and released from the cylinder 17 through the connection 73.

The details of the hydraulic valve assembly illustrated in Figure 8 are as follows. The valve assembly 58 includes the body 70 having a longitudinal bore 106 therein to receive an internal valve sleeve 107 which is retained in place by end caps 108, bolted to the ends of the body 70 and centrally bored, as indicated at 109, to permit the spindle 80 to project from the body 70 in both directions. The sleeve 107 is sealed against the bore 106 at various points along its length by conventional O-ring seals 110, and escape of fluid along the stem 80 is prevented by similar O-ring seals 111 which seal against the interior bore of the sleeve 107. External dust caps 112 prevent dust or other foreign matter from being drawn into the valve mechanism by the actual movement of the spool 80. The spool 80 is threaded at both ends to receive retaining nuts 113 by which it is secured to the yoke 81. Longitudinal adjustment of the spool 80 with respect to the yoke 81 may be accomplished by loosening one of the nuts 113 and tightening the other thereof.

The bore 106 of the body 70 is cored to form a number of annular undercuts therein, one 115 being at the center of the body 70 and communicated with the pressure connection 71 through an oblique passageway 116. Outwardly of the center annular undercut 115 are two similar undercuts 117 and 118 communicated with the respective cylinder connections 73 and 74 by oblique passageways 119 and 120. Outwardly of the cylinder undercuts 117 and 118 are formed fluid return connection 72, directly in the case of the undercut 121 and by a longitudinal passageway 123 (see Figure 7) in the case of the right-hand undercut 122. The sleeve 107 has a number of exterior annular grooves therein, matching the respective undercuts in the bore 106, each being communicated with the interior bore of the sleeve 107.

The valve spool 80 is formed with three necked-down portions 125, 126 and 127, forming therebetween valving flanges 128 and 129 which are positioned, as best seen in Figure 9, to cross from one side to the other of the radial passages underlying the respective cylinder undercuts 117 and 118. It will be noted that when the spool 80 is in the central position shown in Figure 8, the pressure is cut off from both of the cylinders 73 and 74, due to the fact that the valving flanges 128 and 129 lie slightly inwardly of the radial passages leading to the undercuts 117 and 118. It will also be seen that both of the cylinder undercuts 117 and 118 are communicated with the respective return undercuts 121 and 122, whereby the cylinder connections 73 and 74 are in communication with each other. Thus when the valve spool 80 is in the centralized position wherein it is held by a centering spring 95 when no manual control effort is being applied to the system, fluid is free to pass from one cylinder to the other, leaving the wheel 34 free to turn in one direction or another in response to turning moment applied by braking one of the lateral landing wheels or the other, as previously described. Such free movement of the wheel, it will be noted, will drive the strut 30 back and forth in the power unit 15, which movement will be transmitted through the cables 40 and 41 to the control wheel or other manual control which will move in response to movement of the wheel 34.

It should be noted that, in the event of a pressure failure, the unit 15 will not interfere with the manual operation of the nose wheel 34 since the valve assembly 58 will continue to operate to release fluid from the respective cylinders as the pistons 27 and 28 move thereinto in response to manual operation of the strut 30.

The pneumatic modification of the valve assembly 58, illustrated in Figures 10 and 11, consists in removing the sleeve 107, the end caps 108, and spool 80, and replacing these parts with a plurality of parts forming a number of lift valves and seats therefor that perform the respective functions of the flanges 128 and 129 in the hydraulic valve, above described.

In the pneumatic valve, a number of sleeve-like members are inserted in the bore 106 of the body 70, one constituting a spacer bushing 130 positioned midway between the ends of the bore, two abutting the bushing 130, identified at 131 and 132, having opposed valve seats formed therein and outwardly of the valve seat members 131 and 132, two cup-shaped closure members 133 and 134 bored at 135 to permit a quill shaft 136 to project at both ends of the body 70, as in the previously described valve. The quill shaft 136 is secured to the control yoke 81 in the same manner as the valve spool in the previously described valve.

Compressed air applied at the pressure connection 71 is controlled by axially moving lift valves 137 and 138, positioned within the spacer bushing 130 and which are arranged to seat against inwardly facing seats formed in the seat members 131 and 132. The pressure valves 137 and 138 are urged outwardly toward their respective seats by a compression spring 139 which bears against a flange 140 on the valve 137 at one end, and a collar 141 at the other. The collar 141 is secured to the right-hand pressure valve 138 by a snap ring 142, and is recessed so as to surround the snap ring, cage the same and prevent its accidental release. Each of the pressure valves 137 and 138 is connected to the quill shaft 136 by a lost motion connection comprising transverse pins 143 and 144 received in slotted apertures in the respective valves, whereby movement of the quill shaft 136 to the right, for example, moves the valve 137 away from its seat in the member 131 and allows the opposite valve 138 to seat. The quill shaft 136 is formed with longitudinally extending grooves 145 therein and a necked-down portion 146, whereby fluid escaping under the opened valves 137 and 138 moves longitudinally along the quill shaft 136 and thence to the oblique passageways 119 and 120. Thus, compressed air normally fills both cylinders 17 and 18 since the axial spacing of the pins 143 and 144 is such that with the quill shaft in centralized position, both the valves 137 and 138 are off their seats in the outwardly adjacent seat members 131 and 132. Thus also the cylinders 17 and 18 are intercommunicated when the quill shaft 136 is in centralized position. The slotted apertures in the valves 137 and 138, which receive the pins 143 and 144, permit the seating of one of the valves without interfering with the further opening of the other valve. Thus when the quill shaft is decentralized so that air is communicated from the connection 71 through only one oblique passageway, e. g., 119, to the cylinder connection 73, the communication from the other cylinder connection 74 is closed.

Communication of the cylinder connections with the respective return or release undercuts 121 and 122 is similarly effected by axially moving lift valves 148 and 149, similarly secured to the quill shaft 136 by transverse pins 150 and 151 received in slots in the valves. When the quill shaft 136 is in centralized position, the valves 149 and 148 are urged against their respective seats by compression springs 153 and 154 which bear against them, and are anchored at the other ends against seal bushings 155 and 156 which are thus urged outwardly against shoulders 157 and 158 in the end caps 134. Control movement of the quill shaft 136 in one direction or the other from its central position leaves one of the return valves 148 and 149 closed by its respective spring 153 or 154 and opens the other return valve to release air from one of the cylinders. It will be noted that when operating the modification just described, it is necessary to reverse the connections of the hoses 55 and 56. Alternate movement of the quill shaft 136 in one direction or the other closes one or another of the valves 137 and 138 to cut off compressed air from one or another of the cylinders 117 and 118, and at the same time to release air from the non-actuated cylinder through one or another of the valves 148 or 149. In the pneumatic version, it is, of course, unnecessary to return the released air to the pressure source so it is merely released to atmosphere.

As an alternative mode of operation of the compressed air system, the compressed air connection can be made to the normal return connection 72 and the normal pressure connection left open to atmosphere. Under these conditions, the power unit is actuated by opening to atmosphere, the cylinder toward which it is desired that the strut 30 move and delivering compressed air to the other cylinder. Thus it will be seen that in the alternative mode of operation just described, the cylinder connections 73 and 74 are as shown in the drawings and are not reversed as in the first described pneumatic operation.

The arrangement by which the valve assembly is actuated in response to tension in the control cables 40 or 41 is best seen in Figures 4, 5, 6 and 7. Referring particularly to Figure 7, it will be seen that the control yoke 81 by which the valve is moved as aforesaid, is comprised of a pair of end pieces 82 secured to the valve spool and interconnected by a pair of lateral plates 83. The plates 83 are riveted or otherwise suitably attached to the end pieces 82 of the yoke 81 and combine therewith to form a generally oval-shaped aperture 85 extending generally vertically through the yoke to receive a control responsive rocker arm 86 extending downwardly therethrough and carrying the cable sheaves 42 and 43 on a bearing bolt 87. The rocker arm 86 is pivoted at its upper end on the bolt 64 and has an upwardly extending tab 88 for connection to a centering spring assembly 89, later to be described.

At the point where it passes through the aperture 85, the rocker arm 86 has formed thereon a pair of lateral trunnions 90 which are received in slotted apertures 91 in the interconnecting plates 83 which form a part of the yoke 81. Thus, as the rocker arm 86 swings about the pivot bolt 64 in one direction or another, such motion is translated into longitudinal movement of the yoke 81 and hence the valve spool 80. The rocker arm 86 is bifurcated at its lower end to form a pair of guides 92 extending around the sheaves 42 and 43 to retain the cables 40 and 41 thereon.

The arm 86 is at all times urged to a centralized vertical position, illustrated in Figure 4, by means of a centering spring assembly 89 including a compression spring 95 retained in a cylindrical barrel 96 formed as an integral part of the valve body 58, as best seen in Figure 6. The compression spring 95 is retained within the barrel 96 by a threaded retainer bushing 97, best seen in Figure 4, and is further enclosed by a pair of cup-shaped thrust bushings 98 and 99, the cylindrical flanges of which are arranged to engage each other to limit the degree of compression of the spring 95. The left-hand bushing 98 bears against the head of an attachment bolt 100, by which the spring 95 is attached to the tab 88 of the rocker arm 86, and the right-hand bushing 99 bears through a washer 101 against the tab 88. The washer 101 is seated against an inturned flange 102 in the right-hand end of the barrel 96. Thus it will be seen that movement of the tab 88 either to the left or to the right compresses the spring 95, either by tension in the bolt 100 or by compression against the washer 101. The effect of the spring 95, therefore, is to yieldably retain the arm 86 in the vertical position illustrated in Figure 4.

Whenever tension is applied to one of the control cables 40 or 41 to turn the wheel 34 in one direction or the other, the effect of the resultant of the tension forces is to apply unequal moments to the arm 86 about the pivot bolt 64. Such unequal moment overcomes the centering force of the spring 95 and rocks the arm 86 in one direction or another, which rocking movement is translated through the trunnions 90 to the yoke 82 and thence to the valve spool 80 or quill shaft 136, controlling the actuating fluid as previously described. The result of such valve displacement is to deliver actuating fluid to one or the other of the cylinders 17 and 18 so as to assist the manually applied force in steering the wheel 34. Such assistance, it will be observed, is in such direction as to relieve the unbalanced tension in the cables 40 and 41, thus permitting a "follow-up" operation of the centering spring 95 which returns the arm 86 and the valve to a central position cutting off the flow of actuating fluid to either cylinder.

The operation of the apparatus will be apparent from the foregoing description of the construction. The pilot operates the steering controls in the normal manner, and if the terrain over which the ship is taxiing is such that only a small amount of effort is required to turn the wheel 34, then the pilot's efforts may be all that are required and the centering spring 95 will not be compressed since the tension in the cable will be slight and the moment differential on the arm 86 will be correspondingly small. However, when it becomes necessary for the pilot to exert more than a predetermined effort to turn the wheel 34, the tension in one of the cables 40 or 41 becomes sufficiently great to exert a moment on the arm 86 sufficient to compress the spring 95 and actuate the valve as previously described. This actuation of the valve admits hydraulic fluid or compressed air into the appropriate cylinder to assist the pilot in steering the aircraft as previously described. When the wheel has been turned or steered by the desired amount, the unbalance in cable tensions is relieved and the actuating fluid is cut off as previously described.

Should the hydraulic system or the compressed air source fail, the wheel 34 can still be controlled manually without interference by the power unit 15, since hydraulic fluid or air in the cylinders will be released through the fluid return connection 72.

An additional advantage of the system it will be noted, is the fact that the operation of the sensing means comprising the rocker arm 86 and the sheaves 42 and 43 is entirely independent of the static tension in the cables 40 and 41. It is only when a differential tension predetermined by the spring 95 is created by the pilot that the sensing means operates to actuate the valve assembly 58.

While the forms of the device shown and described herein are fully capable of achieving the objects and providing the advantages hereinbefore stated, it will be realized that they are capable of some modification without departure from the spirit of the invention. For this reason, I do not mean to be limited to the forms shown and described, but rather to the scope of the appended claims.

I claim:

1. In a servo control system of the type having a pair of force transmitting members connected to an object for the alternate transmission of manual effort to said object to move the same selectively in one or the other of two directions, servo means augmenting said effort comprising: a double acting fluid motor mechanically connected to said object to apply motivating force to said object selectively in one or the other of said directions; a valve connected in the fluid supply of said motor and operable selectively to actuate said motor in one or the other of said directions; and sensing means including a pair of elements, one engaged with each of said members said elements being arranged to be urged in opposite directions by equivalent stresses in the respective members engaged therewith and a movable mount having said elements supported thereon for concurrent movement therewith, said mount being coupled to said valve to operate the same upon occurrence of a predetermined differential in the stresses in said members.

2. In a servo control system of the type having a pair of force transmitting cables connected to an object for the alternate transmission of manual effort to said object to move the same selectively in one or the other of two directions, servo means for augmenting said effort comprising: a double acting fluid motor mechanically connected to said object to apply a motivating force thereto selectively in one or the other of said directions; a valve connected in the fluid supply of said motor and operable selectively to actuate the same for movement in one or the other of said directions; and sensing means including a pair of elements, one engaged with each of said cables said elements being arranged to be urged in opposite directions by tension in the respective cables engaged therewith and a movable mount having said elements supported thereon for concurrent movement therewith, said mount being coupled to said valve to operate the same upon the occurrence of a predetermined differential in the tensions of said cables.

3. In combination with a manually operated remote control system of the type having a pair of tension cables extending from a point of control to an object to be moved selectively in one of two directions and a double acting fluid motor connected to said object to assist in said movement thereof, a sensing and motor control unit comprising: a valve interposed in the fluid system of said motor and having three positions, in a first of which said motor is ineffective, in a second of which said motor is actuated in a first direction, and in a third of which said motor is actuated in the opposite direction; a movable pulley mount; a pair of pulleys rotatably carried on said mount with one respectively engaged with each of said cables, said cables extending in opposite directions from said pulley mount whereby to exert a force thereon proportional to the differential tension as between said cables; and means coupling said mount to said valve whereby to hold the same in said first position when the tensions in said cables are equal, move said valve to said second position when the tension in a first cable exceeds that in the second, and move said valve to said third position when the tension in said second cable exceeds that in the first.

4. A remote control steering unit for a dirigible wheel assembly having a generally vertical pivot shaft with a gear affixed thereto; a horizontal rack slidably mounted adjacent said shaft and meshed with said gear whereby reciprocation of said rack along its own axis rotates said shaft in opposite directions; a pair of tension cables attached to said rack and having portions of their lengths extending in opposite directions along the axis of said rack from their respective attachments thereto whereby alternate tension in one or the other of said cables moves said rack in opposite directions; a pulley mount rockably supported on a pivot bearing having an axis transverse to said rack axis; a pair of pulleys rotatably carried on said mount on axes substantially parallel to said pivot bearing axis with one of said cables respectively passing around each of said pulleys on opposite sides thereof, whereby equal tensions in said cables balance the moments applied to said pulley mount, and unequal tensions in said cables exert a differential moment on said pulley mount to rock the same in the direction of the attachment of the cable having the greatest tension; a spring connected to said pulley mount to yieldably urge the same to a centralized position in said rocking movement; double acting fluid motor means connected to said rack to move the same selectively in opposite directions as aforesaid; a valve interposed in the fluid system of said motor means and operable selectively to actuate the same in said opposite directions; and a linkage connecting said pulley mount to said valve to move the latter to actuate said motor to assist the motion of said rack urged by a differential tension in said cables.

5. The construction of claim 4 further characterized in that said valve includes a body having a bore therein with a plurality of fluid connections communicated with said bore at axially spaced points therealong, and valving means supported for axial movement in said bore selectively to block or interconnmunicate pairs of said connections.

6. The construction of claim 5 further characterized in that said valving means comprises a spool with valving flanges engaged with the wall of said bore.

7. The construction of claim 5 further characterized in that said valving means comprises a plurality of mechanically intercoupled axially movable lift valves interposed between said communication points in said bore.

8. In combination with a manually operated remote control system of the type having a pair of elongated control members extending from a point of control to an object to be moved selectively in one of two directions and a double acting fluid motor connected to said object to assist in said movement thereof, a sensing and motor control unit comprising: a valve interposed in the fluid system of said motor and having three positions, in a first of which said motor is ineffective, in a second of which said motor is actuated in a first direction, and in a third of which said motor is actuated in the opposite directions; a movable mount; a pair of contact elements carried on said mount with one respectively engaged with each of said control members, said members being arranged to transmit control forces in opposite directions with respect to said mount whereby to exert a reactive force on the latter proportional to the differential of control forces as between said members; and means coupling said mount to said valve whereby to hold the same in said first position when said control forces are equal, move said valve to said second position when the control force in a first member exceeds that in the second, and move said valve to said third position when the control force in said second member exceeds that in the first.

9. In combination with a manually operated remote control system of the type having a pair of tension cables extending from a point of control to an object to be moved selectively in one of two directions and a double acting fluid motor connected to said object to assist in said movement thereof, a sensing and motor control unit comprising: a valve interposed in the fluid system of said motor and having three positions, in a first of which said motor is ineffective, in a second of which said motor is actuated in a first direction, and in a third of which said motor is actuated in the opposite direction; a movable pulley mount; a pair of pulleys rotatably carried on said mount with one respectively engaged with each of said cables, said cables extending in opposite directions from said pulley mount whereby to exert a force thereon proportional to the differential tension as between said cables; means coupling said mount to said valve whereby to hold the same in said first position when the tensions in said cables are equal, move said valve to said second position when the tension in a first cable exceeds that in the second, and move said valve to said third position when the tension in said second cable exceeds that in the first; and centering spring means connected to said mount to yieldably retain the same with said valve in said first position whereby a predetermined excess of tension in one cable over the other is required to move said valve to said second or third positions.

10. In combination with a manually operated remote control system of the type having a pair of tension cables extending from a point of control to an object to be moved selectively in one of two directions and a double acting fluid motor connected to said object to assist in said movement thereof, a sensing and motor control unit comprising: a valve interposed in the fluid system of said motor and having three positions, in a first of which said motor is ineffective, in a second of which said motor is actuated in a first direction, and in a third of which said motor is actuated in the opposite direction; a pair of contact elements one respectively engaged with each of said cables, said cables extending in opposite directions from the respective elements with which they are engaged; movable mounting means interconnecting said contact elements for concurrent movement whereby said mounting means is subjected to a resultant force proportional to the differential tension as between said cables; and means coupling said mounting means to said valve whereby to hold the same in said first position when the tensions in said cables are equal, move said valve to said second position when the tension in a first cable exceeds that in the second, and move said valve to said third position when the tension in said second cable exceeds that in the first.

11. The construction of claim 10 further characterized by having centering means connected to said mounting means to yieldably retain the same with said valve in said first position.

References Cited in the file of this patent

UNITED STATES PATENTS

| | | |
|---|---|---|
| 1,365,347 | Schneider | Jan. 11, 1921 |
| 1,902,356 | Monge | Mar. 21, 1933 |
| 2,031,828 | Garrison | Feb. 25, 1936 |
| 2,227,375 | Carlson | Dec. 31, 1940 |
| 2,352,334 | Macomber | June 27, 1944 |
| 2,385,351 | Davidsen | Sept. 25, 1945 |
| 2,492,649 | MacDuff | Dec. 27, 1949 |